Patented Jan. 9, 1940

2,186,262

UNITED STATES PATENT OFFICE 2,186,262

COMPOSITION AND METHOD FOR PREPARING SAME

James A. Mitchell, Kenmore, N. Y., assignor, by mesne assignments, to E. I. du Pont de Nemours & Company, Wilmington, Del., a corporation of Delaware No Drawing. Application May 31, 1935, Serial No. 24,360

4 Claims. (Cl. 106—40)

This invention relates to compositions of matter suitable for use in the manufacture of plastic masses, coating compositions, pellicles, tubes, filaments or other cast, extruded or molded structures. More particularly, the invention relates to plasticized compositions of matter comprising cellulose derivative base substances.

It is well known in the plastic and coating arts to use, in combination with a base material, a plasticizer or flexibilizing agent to impart resilience to plastc masses, suppleness to pellicles or filaments, and flexibility to coatings. A large variety of plasticizers are available, depending on the type of base material and/or the type of composition or product desired. Among the plasticizers which have been proposed for use, especially in combination with cellulose derivative base materials, are certain sulfonamide derivatives, particularly certain N-alkylated derivatives of aryl or substituted aryl sulfonamides. The prior art has been concerned, however, only with the low-carbon alkyl derivatives such as mono- or di-N-methyl, or N-ethyl derivatives of benzene, toluene or xylene sulfonamides. Furthermore, these derivatives of the prior art have been low-carbon alkyl derivatives which are liquid at ordinary temperatures. These derivatives have served a useful purpose as plasticizing agents, especially for compositions comprising cellulose acetate, but they are lacking in many properties which are now desirable in the advanced state of the plastic, coating and pellicle arts.

It has now been found that N-alkyl derivatives of aryl sulfonamides wherein the N-alkyl substituent contains 4 to 18 carbon atoms, are particularly useful plasticizing agents for cellulose derivative base materials since they impart improved softness and greater thermoplasticity without permanent tackiness. These properties and others which will be set forth hereinafter render them of particular advantage in the manufacture of plastic masses, pellicular structures, filaments, coating compositions and the like.

It is therefore an object of this invention to prepare a composition of matter plasticized with N-alkyl derivative of aryl sulfonamide wherein the N-alkyl substituent contains 4 to 18 carbon atoms.

It is another object of this invention to prepare compositions of matter comprising cellulose derivative base materials plasticized by means of N-alkyl aryl sulfonamides having a carbon content of 4 to 18 carbon atoms in the N-alkyl substituent group.

Other objects of the invention will be apparent from the following description and claims.

The objects of the invention are accomplished in general by incorporating 5 to 60% and preferably 10 to 35% of a N-alkyl aryl sulfonamide having a carbon content of 4 to 18 carbon atoms in the N-alkyl substituent group in a composition comprising a cellulose derivative in any suitable manner.

The N-alkyl aryl sulfonamides involved in the present invention may be prepared in accordance with any of the known methods for the manufacture of substances of this character. Thus, aryl sulfonamides or nuclear substituted aryl sulfonamides may be reacted with the appropriate higher alkyl halides in the presence of alkalies or, alternatively, the aryl or nuclear substituted aryl sulfone chlorides may be reacted with mono- or di-alkyl amines. In any event, the degree of alkylation can be controlled by the choice of method of preparation or by the relative proportions of the reactants. The reaction products may be isolated and purified in the usual way and subsequently incorporated in the desired composition.

For the preparation of the higher N-alkyl sulfonamide derivatives useful in the practice of the instant invention alkyl amines or alkyl halides containing 4 to 18 carbon atoms are employed. Such alkylating agents may include straight chain alkyl residues from butyl to stearyl as well as various branched chain residues. Among the latter, the halides or amines derived from the alcohols produced as by-products in the manufacture of synthetic methanol or by the hydration of the unsaturated hydrocarbons obtained in the cracking of petroleum hydrocarbons may be mentioned. Generally speaking, saturated alkyl residues are preferred but unsaturated groups may be employed if desired. At least one of the N-alkyl substituent groups must be open chain aliphatic and contain 4 to 18 carbon atoms although the second N-alkyl substituent group, if present, may be similar or different and, if different, may be saturated, unsaturated, cyclic, aryl, or the like.

The sulfonic acid residue in the sulfonamide may be derived from an aryl or nuclear substituted aryl sulfonamide or sulfone chloride, as for example the sulfonamides or sulfone chlorides of benzene, toluene, xylene, ethyl benzene, chlorobenzene, dichlorobenzene, tetrahydronaphthalene, naphthalene, or the similar derivatives. Obviously the sulfonamide will be used to react with the alkyl halides while the sulfone chloride will be used if reaction is intended with an alkyl amine.

Thus, it will be seen that the higher N-alkyl aryl sulfonamides contemplated by the invention embrace such compounds as may be represented by the following type formula:

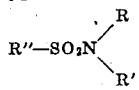

where R is an aliphatic radical of either straight or branched chain, primary, secondary or tertiary and containing 4 to 18 carbon atoms. The group R' may be similar to R or it may be hydrogen, alkyl, alkoxyalkyl, aryl, aralkyl, alicyclic or the like and R'' may be benzene, its homologues, or the hydrogen, halogen, alkyl, alkoxy, aryl or hydrocarbon substitution products thereof. Where the substituent group in benzene or its homologue is hydrocarbon, it may be divalent and substitution may take place in the ortho, meta or para positions of the aryl nucleus.

Although its preparation does not constitute a part of this invention, the following example will illustrate a typical method of preparing a sulfonamide derivative which is useful in the practice of the invention.

EXAMPLE I
*Mono-butyl p-toluene sulfonamide*

One hundred twenty-six grams of p-toluene sulfone chloride are added, slowly with efficient stirring and cooling, to a mixture containing 50 grams of monobutyl amine, 100 grams of water and 28 grams of sodium hydroxide. The reaction proceeds smoothly with the formation of monobutyl p-toluene sulfonamide which separates as a water-insoluble solid. The product may be purified by dissolving it in concentrated sodium hydroxide solution and reprecipitation with hydrochloric acid or, alternatively, it may be crystallized from an ethyl alcohol solution. The purified product melts at about 42° C. and is very compatible with cellulose derivative base materials.

Where it is desired to prepare di- substituted sudfonamides having different N-alkyl groups, it is apparent that a mono- substituted sulfonamide will serve advantageously as a starting material. Thus, for instance, the monobutyl p-toluene sulfonamide of Example I may be provided with a second N- substituent group by treatment with the appropriate alkylating agent, such as iso-amyl chloride, to yield butyl isoamyl p-toluene sulfonamide.

Most of the N-alkyl sulfonamides having 4 to 18 carbon atoms in at least one N-alkyl residue, as required by the instant invention, are white crystalline solids, although in some cases they are substantially water-white, viscous liquids. They are quite high boiling and are compatible with cellulose derivatives. They are much more satisfactory as plasticizing agents than those known heretofore because of their higher degree of water and moisture resistance.

As typical examples, the following non-limitative formulations are given to show the utility of these N-alkyl sulfonamides in a variety of coating compositions. In these examples the parts by weight of the various ingredients refer to the solids content. The term "solvent" designates suitable solvent mixtures, as of esters, alcohols and hydrocarbons, which will be obvious to one skilled in the art.

EXAMPLE II

| | Parts by weight |
|---|---|
| Cellulose nitrate | 12 |
| Gum damar | 3 |
| Mono-n-octyl p-toluene sulfonamide | 4 |
| Castor oil | 2.6 |
| Solvent | 166 |

EXAMPLE III

| | Parts by weight |
|---|---|
| Ethyl cellulose | 12 |
| Monolauryl benezene sulfonamide | 4 |
| Solvent | 180 |

EXAMPLE IV

| | Parts by weight |
|---|---|
| Cellulose nitrate | 12 |
| Pigment | 16 |
| Resins | 3.5 |
| Oil | 3.5 |
| Di-isoamyl xylene sulfonamide | 4 |
| Solvent | 181 |

The compositions set forth in Examples II, III and IV are typical of those used for coating metal, wood, or the like, and represent a variety of protective lacquer coatings.

Typical plastic or molding compositions are illustrated in the following examples. The compositions may be prepared with or without the usual volatile solvents such as alcohol, acetone, or mixtures of toluene and alcohol, etc. in the manner well known to the art.

EXAMPLE V

| | Parts by weight |
|---|---|
| Cellulose acetate | 100 |
| Monobutyl p-toluene sulfonamide | 40 |

EXAMPLE VI

| | Parts by weight |
|---|---|
| Cellulose nitrate | 100 |
| Mono-octyl p-toluene sulfonamide | 60 |
| Pigment | 200 |

EXAMPLE VII

| | Parts by weight |
|---|---|
| Ethyl cellulose | 100 |
| Monolauryl benzene sulfonamide | 15 |

The compositions illustrated by Examples V, VI and VII are dissolved in a suitable quantity of solvent to produce a product of the necessary consistency which may be appropriately molded or formed into variously shaped articles, sheets, films, or the like.

As illustrative of a moistureproofing coating composition having desirable heat-sealing properties, the following examples are given:

EXAMPLE VIII

| | Parts by weight |
|---|---|
| Cellulose nitrate | 10 |
| Dewaxed damar | 1.5 |
| Paraffin wax | 0.6 |
| Monobutyl p-toluene sulfonamide | 7.3 |
| Solvent | 140 |

EXAMPLE IX

| | Parts by weight |
|---|---|
| Cellulose nitrate | 10 |
| Dewaxed damar | 1.3 |
| Paraffin wax | 0.6 |
| Octyl p-toluene sulfonamide | 6.7 |
| Solvent | 140 |

Compositions of the above type are useful in moistureproofing various base structures, particularly cellulosic pellicles such as those composed of regenerated cellulose, glycol cellulose, celluose glycollic acid or the like, as in the manufacture of transparent, flexible, wrapping tissues which are substantially non-fibrous, yet are moistureproof and satisfactorily heat-sealable.

A solvent composition suitable for use in the above examples may be as follows:

| Solvents | Preferred compositions | Probable satisfactory solvent range |
| --- | --- | --- |
| | Percent by weight | Percent by weight |
| Ethyl acetate | 55 | 45-75 |
| Toluene | 35 | 25-50 |
| Alcohol | 10 | 0-30 |

In the foregoing examples of coating and plastic compositions it will be understood that other cellulose derivatives, including cellulose propionate, cellulose butyrate, cellulose acetate-butyrate, benzyl cellulose, lauryl cellulose, butyl cellulose, or the like, may be substituted for all or part of the cellulose derivative specified.

Similarly, other natural resins such as kauri, sandarac, shellac, etc., or other synthetic resins such as polymerized vinyl aceate, phenol-aldehyde resins, polybasic acid-polyhydric alcohol condensation products (alkyd resins), polyether resins obtained by condensation of polyhydric phenols with alkyl polyhalides or various other natural or synthetic resins may be employed in combination with the above-described N-alkyl aryl sulfonamides.

As the plasticizer, any of the N-alkyl sulfonamides of the type described herein may be used alone or in combination with other compounds of the same type, or with other previously known plasticizers such as triacetin, camphor, dibutyl phthalate, tricresyl phosphate, methoxyethyl phthalate, or the like.

As previously stated, the N-alkyl sulfonamides of the type described herein are superior to the low carbon alkyl substituted sulfonamides heretofore suggested as plasticizing agents because, inter alia, of their improved water and moisture resistance and their ability to impart these properties to compositions containing them. These properties make them particularly useful in the preparation of moistureproofing compositions where it is desired to provide a coating which will be substantially impervious to the transmission of water vapor. Thus, compositions of the character set forth in Charch et al. U. S. Patent No. 1,737,187 may be prepared to advantage with N-alkyl sulfonamides.

Furthermore, the ability of these plasticizing agents to impart improved thermoplasticity to compositions containing them, makes them particularly useful in the preparation of coating compositions which are capable of self-sealing on the application of heat. Thus, if a moistureproofing coating composition which will be heat-sealable is desired, the plasticizers of the type described will be of especial value.

Moistureproofing coating compositions generally comprise a film-forming base material such as a cellulose derivative or a resinous material and a moistureproofing agent such as a wax, with or without added plasticizer and/or resin. It has been found that the plasticizer may play an important role in the production of a highly moistureproof coating not only as a flexibilizing and plasticizing agent but in augmenting the moistureproofness. This property is noted in the N-alkyl sulfonamides of the type described herein and it has been found that the ability to augment moistureproofness increases with increase in the carbon content of the N-alkyl substituent. Generally, the straight chain alkyl derivatives are more potent than the isomeric branched chain alkyl derivatives while the di-substituted derivatives having two similar N-alkyl substituents are better than the corresponding mono- derivatives.

Insofar as the heat-sealing property of the compound is concerned, that is to say, its plasticizing action at elevated temperatures, it has been found that increase in carbon content of the N-alkyl substituent tends to decrease the effectiveness of the compound. The mono- substituted derivatives are generally superior to the di- substituted derivatives and the N-alkyl groups having branched chain hydrocarbon residues are superior to the isomeric straight chain derivatives.

It is unobvious, therefore, that a composition of matter capable of a high degree of moistureproofness and having also a high capability for heat-sealing, would be possible. Yet this is possible through the use of plasticizing agents of the type described herein by appropriate choice of the type of N-alkyl substituent and the proportion of plasticizer depending on whether it adds to or detracts from the properties desired. It is even more surprising that the mono- or di-butyl p-toluene sulfonamides have the unique property of augmenting both the moistureproofness and the thermoplasticity. This last renders them particularly useful in the formulation of heat-sealable moistureproofing coating compositions.

The compositions of matter prepared in accordance with this invention comprising cellulose derivative base materials plasticized by means of higher N-alkyl aryl sulfonamides having a carbon content of 4 to 18 carbon atoms in at least one of the N-alkyl substituent groups are extremely useful as coating compositions for metal, wood, paper, fabric, wire screen, various cellulosic structures and pellicles. Such plasticized cellulose derivative base materials may be used as plastic compositions in the manufacture of filaments, pellicles, sheets, tubes, rods, safety glass interlayers, dentures, or the like.

The plasticizing agents described are more water-resistant than similar compounds known to the art. They are high-boiling and therefore substantially non-volatile and the compositions containing them possess properties definitely superior to those of similar compositions using plasticizing agents heretofore known.

Although the invention has been described with particular reference to the use of the above-identified N-alkyl derivatives of aryl sulfonamide in substances having a base comprising cellulose derivative, they may also be used to great advantage as a plasticizer for various synthetic resins, for example, methyl methacrylate, vinyl acetate, alkyd resins or the like.

Since the invention may obviously be varied in many of its aspects from the above detailed description without departing from the nature and spirit thereof, it is to be understood that the invention is not to be limited thereto except as set forth in the appended claims.

I claim:
1. A cellulosic composition for producing mois- tureproof articles comprising cellulose nitrate, a wax and a plasticizer of the formula

in which R designates an aliphatic radical containing 4 to 18 carbon atoms; R' designates a radical from the group which consists of hydrogen, alkyl, alkoxyalkyl, aryl, aralkyl and alicyclic; and in which R'' is selected from the group which consists of benzene, its homologues, the hydrogen, halogen, alkyl, alkoxy, aryl and hydrocarbon substitution products thereof.

2. A cellulosic composition for producing moistureproof articles comprising cellulose nitrate, a resin, a wax and a plasticizer of the formula

in which R designates an aliphatic radical containing 4 to 18 carbon atoms; R' designates a radical from the group which consists of hydrogen, alkyl, alkoxyalkyl, aryl, aralkyl and alicyclic; and in which R'' is selected from the group which consists of benzene, its homologues, the hydrogen, halogen, alkyl, alkoxy, aryl and hydrocarbon substitution products thereof.

3. A composition for producing moistureproof articles comprising 10 parts cellulose nitrate, 1.5 parts dewaxed damar, 0.6 part paraffin wax, and 7.3 parts monobutyl p-toluene sulfonamide, the proportions being by weight.

4. A cellulosic composition for producing moistureproof articles comprising cellulose nitrate, dewaxed damar, paraffin wax and monobutyl p-toluene sulfonamide.

JAMES A. MITCHELL.